(12) United States Patent
Eom

(10) Patent No.: US 8,885,125 B2
(45) Date of Patent: Nov. 11, 2014

(54) LCD INCLUDING A COLOR FILTER SUBSTRATE WITH FIRST AND SECOND ELECTRODE LINES CORRESPONDING TO A BLACK MATRIX

(75) Inventor: Tae Yong Eom, Beijing (CN)

(73) Assignee: Beijing Boe Optoelectronics Technology Co., Ltd., Beijing (CN)

(*) Notice: Subject to any disclaimer, the term of this patent is extended or adjusted under 35 U.S.C. 154(b) by 458 days.

(21) Appl. No.: 12/878,183

(22) Filed: Sep. 9, 2010

(65) Prior Publication Data

US 2011/0063549 A1    Mar. 17, 2011

(30) Foreign Application Priority Data

Sep. 11, 2009    (CN) .......................... 2009 1 0092942

(51) Int. Cl.
  *G02F 1/1333*    (2006.01)
  *G02F 1/1343*    (2006.01)
  *G02F 1/1335*    (2006.01)

(52) U.S. Cl.
  CPC .............. *G02F 1/133512* (2013.01); *G02F 2001/133397* (2013.01); *G02F 2201/122* (2013.01)
  USPC ............................ 349/110; 349/111; 349/141

(58) Field of Classification Search
  USPC ................................. 349/110–111, 129, 141
  See application file for complete search history.

(56) References Cited

U.S. PATENT DOCUMENTS

| | | | |
|---|---|---|---|
| 6,429,918 B1* | 8/2002 | Choi et al. | 349/111 |
| 2004/0174484 A1* | 9/2004 | Matsumoto | 349/139 |
| 2008/0024711 A1* | 1/2008 | Yanagawa et al. | 349/143 |
| 2009/0079917 A1 | 3/2009 | Pan | |
| 2009/0109356 A1* | 4/2009 | Kitagawa | 349/33 |
| 2009/0122240 A1* | 5/2009 | Lim | 349/106 |

FOREIGN PATENT DOCUMENTS

| | | |
|---|---|---|
| CN | 1794481 A | 6/2006 |
| CN | 101393343 A | 3/2009 |
| JP | 2001-255411 A | 9/2001 |
| JP | 4003842 B2 | 11/2007 |

* cited by examiner

*Primary Examiner* — Jessica M Merlin
(74) *Attorney, Agent, or Firm* — Ladas & Parry LLP

(57) ABSTRACT

An embodiment provides a liquid crystal display (LCD) color filter substrate comprises a transparent substrate and a black matrix, which comprises a plurality of horizontal bars and vertical bars. Electrode lines are provide on the horizontal bars or vertical bars of the black matrix, and are used to eliminate charges accumulated on the transparent substrate.

4 Claims, 5 Drawing Sheets

LCD INCLUDING A COLOR FILTER SUBSTRATE WITH FIRST AND SECOND ELECTRODE LINES CORRESPONDING TO A BLACK MATRIX

BACKGROUND

Embodiments of the invention relate to a liquid crystal display (LCD) color filter substrate and a LCD capable of eliminating image sticking and the manufacturing method thereof.

Generally, a LCD comprises a liquid crystal panel, a polarization plate, and a backlight module. The liquid crystal panel comprises an array substrate, a color filter substrate, and a liquid crystal layer formed by drop-filling liquid crystal after the array substrate and the color filter substrate have been positioned face to face with high precision.

FIG. 1 is the schematic plan view of a conventional LCD color filter substrate. FIG. 2 is sectional view taken along A-A of FIG. 1. As shown in FIG. 1 and FIG. 2, the color filter substrate comprises: a transparent substrate 1, a black matrix 2, and color resin units 3. Among them, the black matrix 2 is in a grid structure comprising a plurality of horizontal bars 21 and vertical bars 22 perpendicularly intersecting one another. The horizontal bars 21 or the vertical bars 22 of the black matrix 2 is disposed on the transparent substrate 1, in alternation with the color resin units 3.

FIG. 3 is the schematic plan view of one pixel region of the conventional LCD. In FIG. 3, the area indicated by dashed lines represents elements of the color filter substrate, and the structure indicated by solid lines represents elements on the array substrate. In FIG. 3, the black matrix is shown as transparent for clearly showing the configuration of the array substrate shielded by the color filter substrate.

As shown in FIG. 3, the black matrix 2 of the color filter substrate is disposed in correspondence with a gate line 100, a data line 200, a TFT (thin film transistor) 300, and a common electrode 500; the black matrix 2 is employed to shield these elements. The area shielded by the black matrix 2 is referred to as the "non-opening region." The color resin units 3 include resin units of three colors, for example, red, green, and blue (RGB). Each color resin unit 3 is disposed in correspondence with a pixel electrode 400. The area corresponding to the color resin units is referred to as the "opening region."

The pixel electrode 400 are formed with slits 401, which constitute a slit unit 410; the pixel region is provided with two symmetrical slit units 410, as shown in FIG. 3.

At present, the manufacturing process for large-size panels chiefly employs liquid crystal one-drop-filling (ODF) process, by which a given amount of liquid crystal is first dropped on an array substrate, next the array substrate and a color filter substrate are precisely positioned and combined in vacuum, and then the liquid crystal panel is formed though thermal hardening of sealant.

During the process of forming a liquid crystal panel, static electricity may form on the array substrate and the color filter substrate, and when a LCD is in use, charges will accumulate gradually on the color filter substrate. Not eliminated, the charges interfere with the liquid crystal driving electrical field, which leads to image sticking.

SUMMARY

An embodiment of the invention provides a liquid crystal display (LCD) color filter substrate, comprising: a transparent substrate; and a black matrix, which is disposed on the transparent substrate and comprises a plurality of horizontal bars and vertical bars; and electrode lines, provided on the transparent substrate in correspondence with the respective horizontal bars or the vertical bars of the black matrix and disposed in the area where the black matrix is disposed.

Another embodiment of the invention provides a liquid crystal display (LCD), comprising an array substrate, a color filter substrate, and a liquid crystal layer disposed between the array substrate and the color filter substrate. The color filter substrate comprises: a transparent substrate; and a black matrix, which is disposed on the transparent substrate and comprises a plurality of horizontal bars and vertical bars; and electrode lines, provided on the transparent substrate in correspondence with the respective horizontal bars or the vertical bars of the black matrix and disposed in the area where the black matrix is disposed.

Further another embodiment of the present invention provides a method of manufacturing a liquid crystal display (LCD) color filter substrate comprising: forming a black matrix on a transparent substrate, wherein the black matrix comprises a plurality of horizontal bars and vertical bars; forming color resin units on the transparent substrate, which correspond to opening regions in the back matrix; and forming electrode lines on the transparent substrate, wherein the electrode lines are in correspondence with the respective horizontal bars or the vertical bars of the black matrix and disposed in the area where the black matrix is disposed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

The color filter substrate of a liquid crystal display (LCD) according to an embodiment of the invention comprises: a transparent substrate; and a black matrix including a plurality of horizontal bars and vertical bars, wherein the horizontal bars or vertical bars of the black matrix are provided with electrode lines for eliminating charges accumulated on the color filter substrate. The image sticking, caused by static electricity or accumulated charges generated on the color filter substrate, can be eliminated.

Detailed description of the embodiment will be given below with reference to the accompanying drawings.

Figure 1:
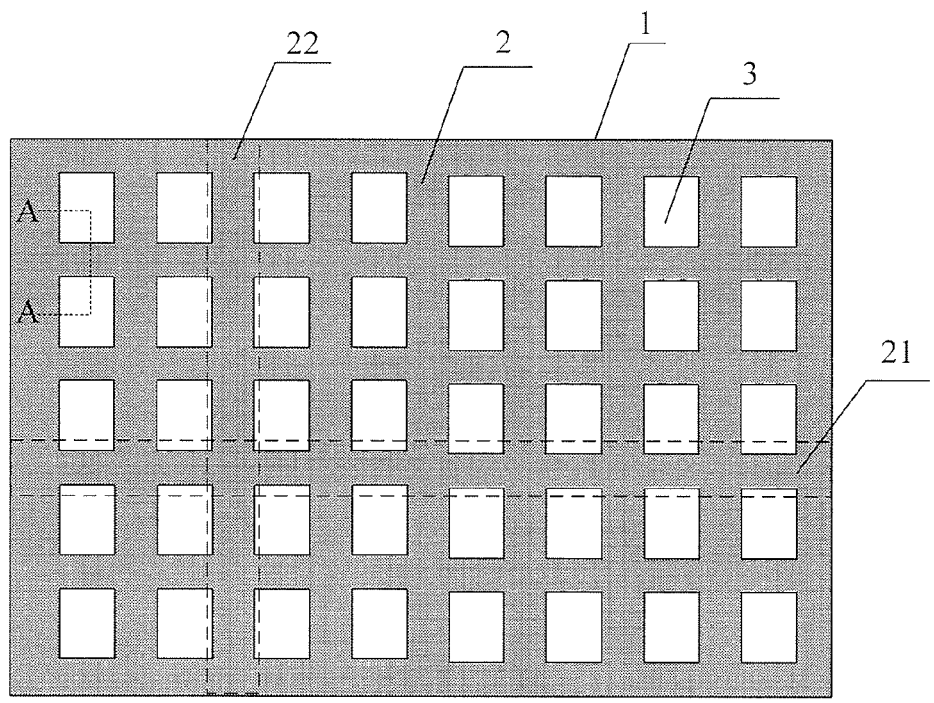
FIG. 1 is the schematic plan view of a conventional LCD color filter substrate.
Figure 2:
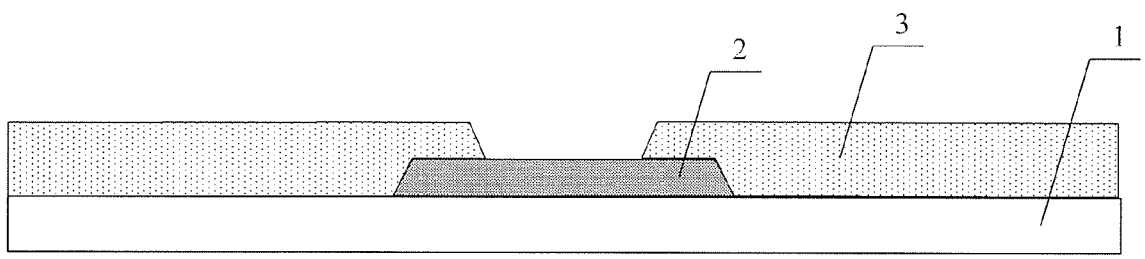
FIG. 2 is sectional view taken along A-A of FIG. 1.
Figure 3:
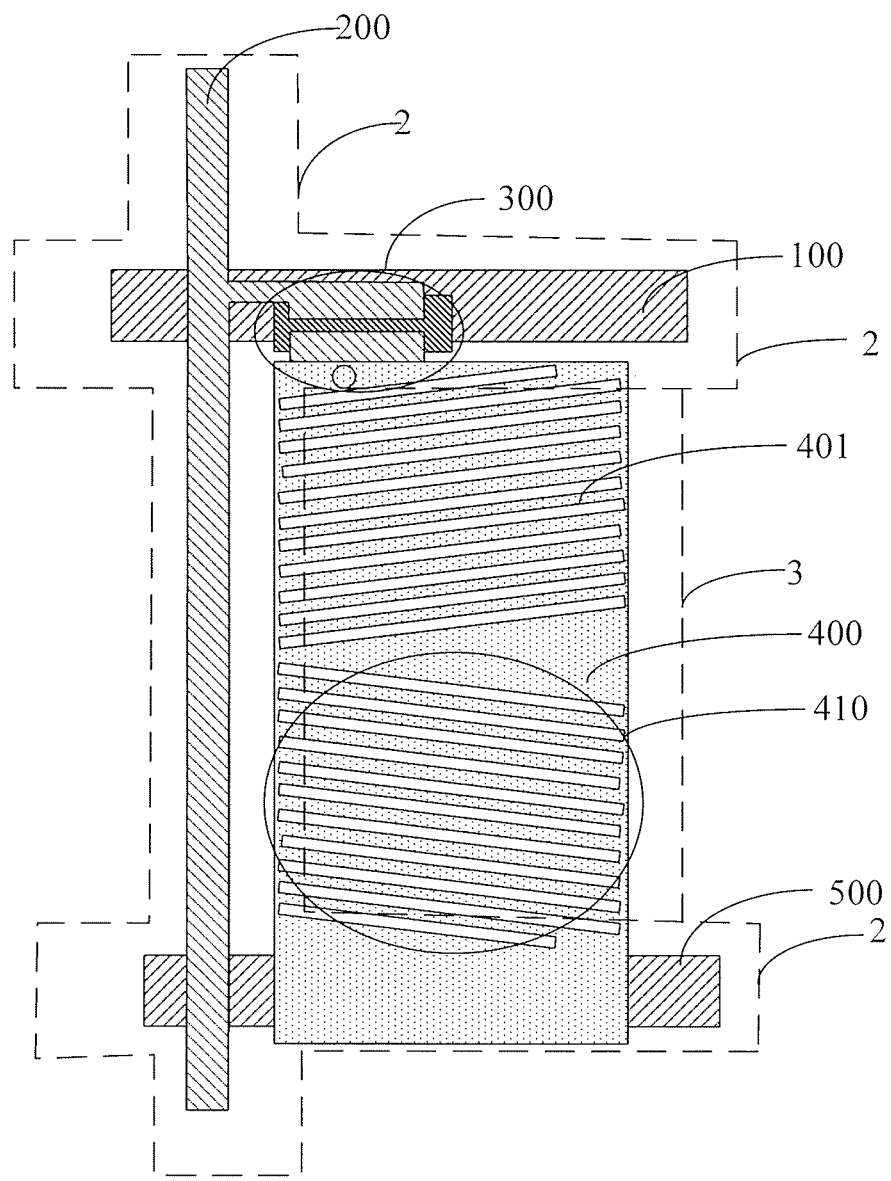
FIG. 3 is the schematic plan view of one pixel region of the conventional LCD.
Figure 4:
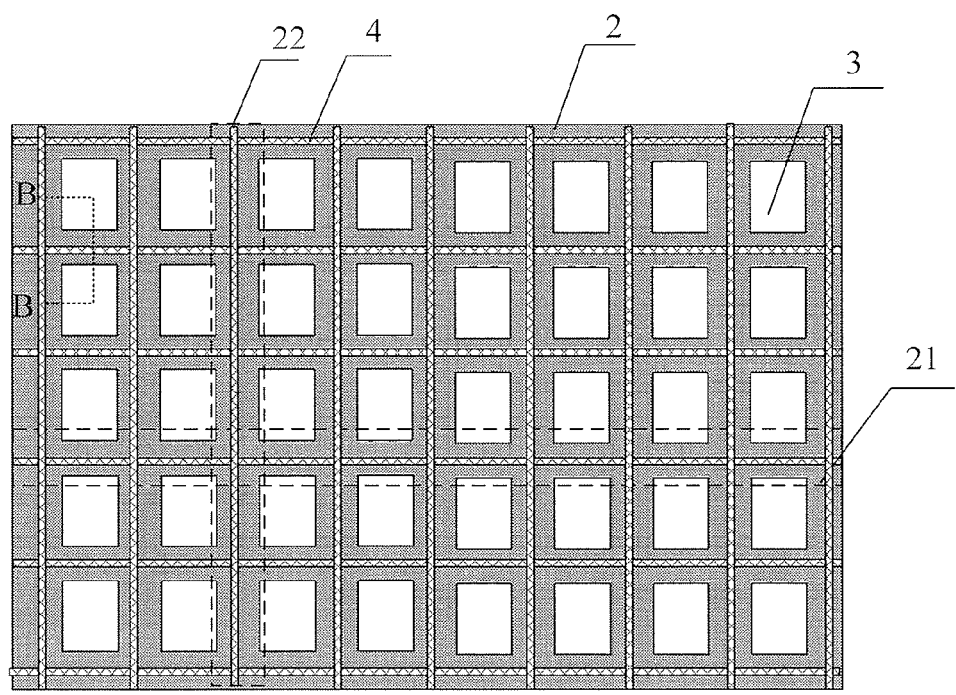
FIG. 4 is schematic plan view of the LCD color filter substrate according to the first embodiment of the invention.
Figure 5:
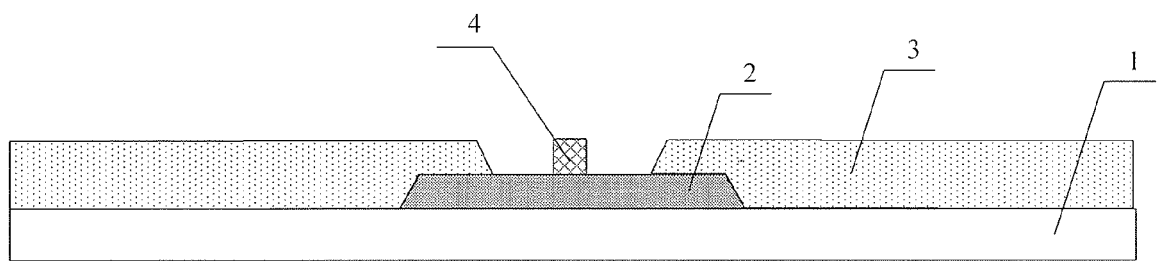
FIG. 5 is the sectional view taken along B-B of FIG. 4.

FIG. 4 is schematic plan view of the LCD color filter substrate according to the first embodiment of the invention, and FIG. 5 is the sectional view taken along B-B of FIG. 4.

As shown in FIG. 4 and FIG. 5, a LCD color filter substrate comprises: a transparent substrate 1, a black matrix 2, color resin units 3, and electrode lines 4. The black matrix 2 is in a grid structure comprising a plurality of horizontal bars 21 and vertical bars 22 perpendicularly intersecting one another. The black matrix 2 and the color resin units 3 are formed on the transparent substrate 1. The region surrounded by two adjacent horizontal bars 21 and two adjacent vertical bars 22 is formed with a color resin unit 3. An electrode line 4 is provided on each horizontal bar 21 and each vertical bar 22 of the black matrix 2. Charges can be transported through the electrode lines 4, eliminating static electricity or accumulated charges generated on the color filter substrate.

In the embodiment, electrode lines 4 that are formed both on the horizontal bars 21 and on the vertical bars 22 forms an electrode grid. Here, the electrode lines of the entire electrode grid are electrically connected to each other, and the electrode grid, therefore, can be connected, at one spot, to an external voltage source. It is obvious that electrode lines 4 may be formed only on the horizontal bars 21 or only on the vertical bars 22, and thus it is necessary to connect these electrode lines 4 on the horizontal bars 21 or the vertical bars 22 to an external voltage source.

The embodiment only illustrates the case where the electrode lines are provided on the black matrix. Yet in a particular implementation, the electrode lines can be formed below the black matrix, i.e., between the horizontal bars or the vertical bars of the black matrix and the transparent substrate; or they can be formed within the horizontal bars or the vertical bars of the black matrix. As a matter of fact, the electrode lines can be configured in any structure, as long as they can eliminate the static electricity or charges that cause image sticking. For example, some of the electrode lines can be formed on the black matrix, while others can be formed below the black matrix.

In this embodiment, the suitable array substrate is not limited, and various kinds of array substrates can be used in connection with the above mentioned color filter substrate.

For the sake of applying voltage to the electrode lines, each electrode line is preferably disposed in the longitudinal direction along the corresponding horizontal bar or vertical bar of the black matrix. The length of each electrode line is preferably equal to that of the corresponding horizontal bar or vertical bar. In such a case, the voltage source for driving can be wired in from the outside of the color filter substrate. Preferably, a driving voltage of 0 to ±5V is wired in from the outside. Alternatively, the electrode lines and etc. can be driven by an internal device such as the signal lines on the color filter substrate or the array substrate, in which case the electrode lines should be appropriately connected to the signal lines (such as the gate lines, the common electrode lines, and etc.).

The widths of the electrode lines are adjustable as necessary. Each electrode line preferably has a width smaller than the corresponding horizontal bar or the vertical bar of the black matrix, more preferably with a width of 1-3 µm. If an electrode line has too large a width, the black matrix may be unable to shield scattered light around the electrode line, which results in light leakage, adversely effecting normal displaying.

In addition, it is also feasible to avoid the interference with the signal lines through selecting the time of charging the electrode lines. For example, switching on the gate lines is carried out when charging the electrode lines is not carried out, so as to reduce the influence on gate lines; or, no charging is carried out when a LCD is at work, the electrode lines are charged when the LCD is off, so as to eliminate static electricity.

Figure 6:
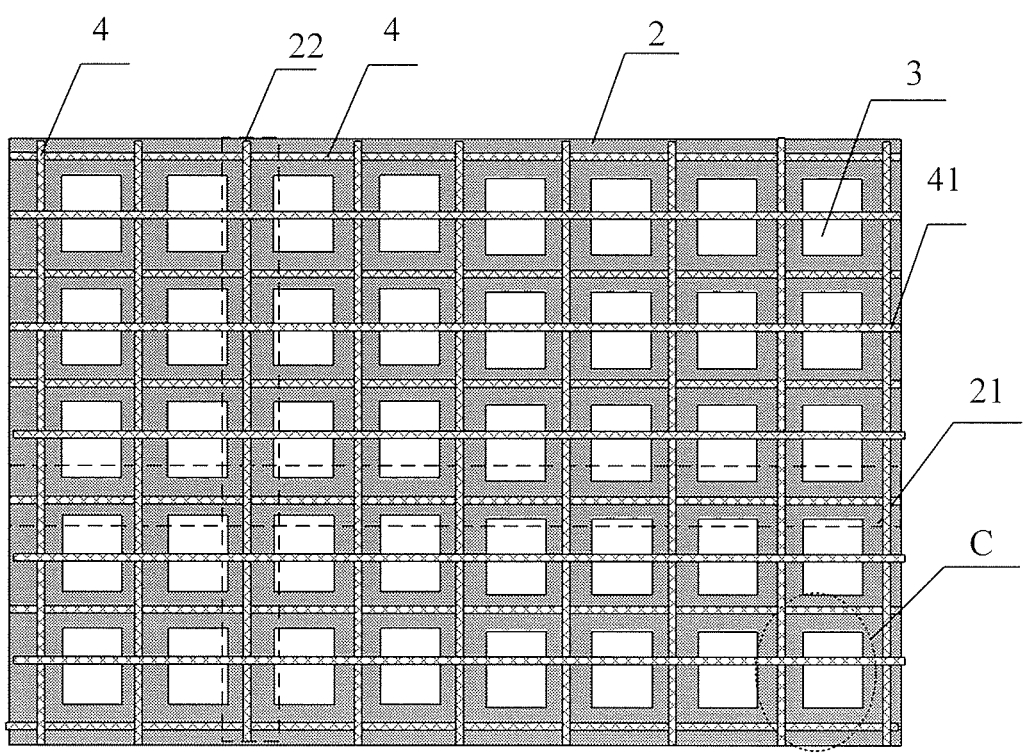
FIG. 6 is the schematic plan of the LCD color filter substrate according to the second embodiment of the invention.
Figure 7:
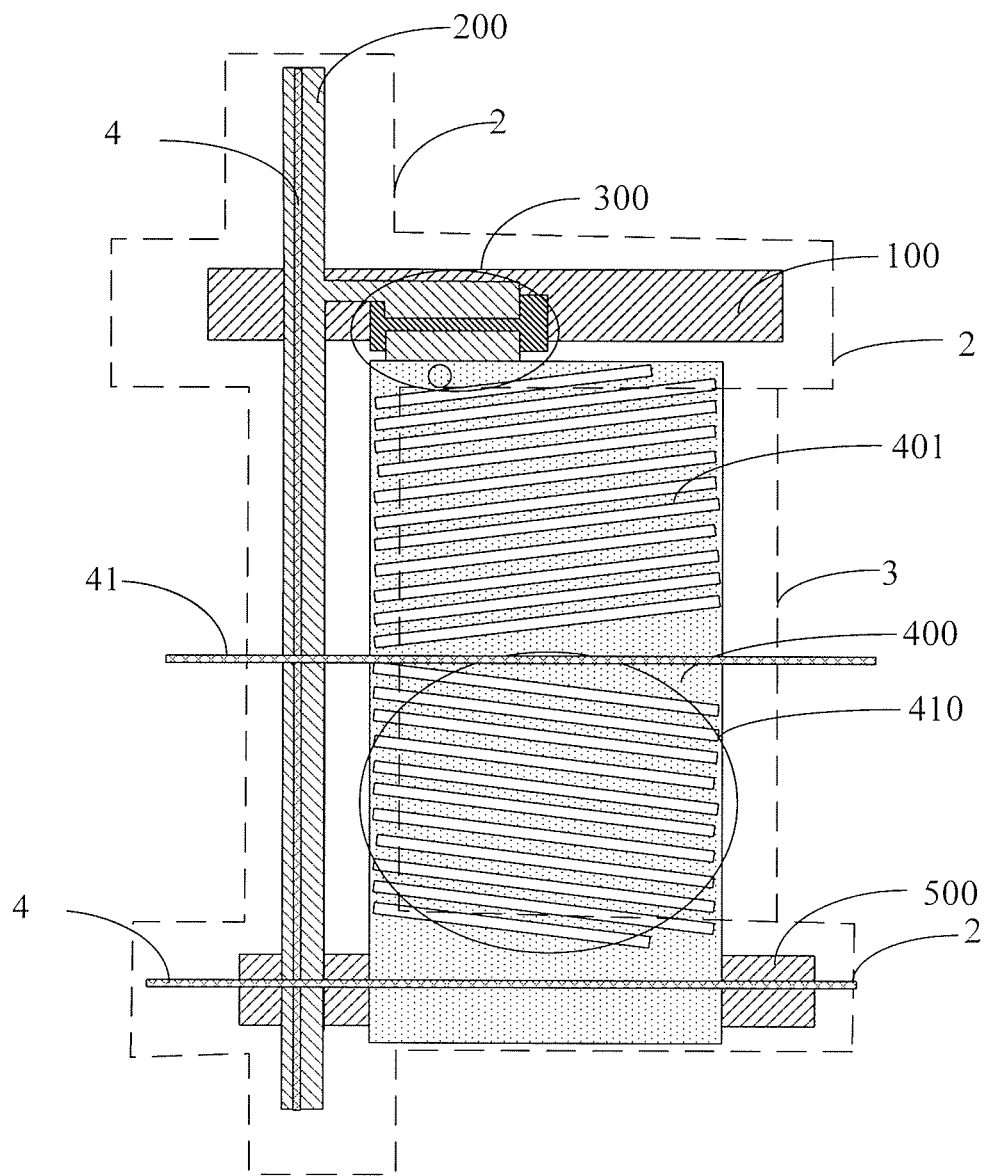
FIG. 7 is the enlarged view of the C area in FIG. 6.

FIG. 6 is the schematic plan of the LCD color filter substrate according to the second embodiment of the invention; FIG. 7 is the enlarged view of the C area in FIG. 6. In FIG. 6, the area indicated by dashed lines represents elements of the color filter substrate, and the structure indicated by solid lines represents elements on the array substrate. In FIG. 7, the black matrix is shown as transparent for clearly showing the configuration of the array substrate shielded by the color filter substrate.

As shown in FIG. 6 and FIG. 7, compared with the first embodiment, the color filter substrate of this embodiment further includes second electrode lines 41, and each second electrode line 41 is disposed on the color resin units 3. As the portion occupied by a color resin unit belongs to an opening region of the color filter substrate, and the material for the electrode lines 41 is preferably transparent material, and more preferably, indium tin oxide (ITO) or indium zinc oxide (IZO). In this embodiment, each of the pixel electrodes of the array substrate may have two slits units 41, which may be preferably symmetrical to each other, as shown in FIG. 7. Preferably, as shown in FIG. 7, the electrode line 41 each corresponds to the part between two slit units 410 of the electrode 400 of one pixel region.

Through further disposing second electrode lines on the parts between two adjacent slit units of pixel regions, the embodiment can eliminate, more directly, the charges on the color resin units, and thus solve the problem of image sticking due to static electricity more effectively.

An embodiment of the invention provides a method of manufacturing the color filter substrate of the LCD, comprising the steps of: depositing a conductive film on the transparent substrate formed with color resin units and a black matrix; and forming a pattern of the electrode lines with a patterning process. The pattern of the electrode lines comprises a group of electrode lines formed on the horizontal bars and/or vertical bars of the black matrix, and the electrode lines are used to eliminate charges accumulated on the color filter substrate.

Another embodiment of the invention provides a method of manufacturing a LCD, comprising the steps of: forming an array substrate having pixel electrodes; and forming a color filter substrate, comprising: depositing a conductive film on the transparent substrate formed with color resin units and a black matrix; and forming a pattern of the electrode lines with a patterning process. The pattern of the electrode lines comprises a group of electrode lines formed on the horizontal bars and/or vertical bars of the black matrix, and the electrode lines are used to eliminate charges accumulated on the color filter substrate.

In another embodiment, the color filter substrate is further formed with second electrode lines, disposed on the color resin units.

In the LCD of this embodiment, each pixel electrode on the array substrate preferably comprises silts, which can be grouped into two slit units. More preferably, each second electrode line corresponds to the part between two slit units of the pixel electrode of one pixel region on the array substrate.

Preferably, the material for the second electrode lines comprises ITO or IZO.

The patterning process used in the embodiments according to the invention comprises: applying photoresist, exposing and developing of photoresist, etching process, and etc., all of which are regular processes in the field of micro-electronic manufacturing.

The following should be understood: in the description, the term "on" and "below" refer to some direction as indicated in the drawings; for example, as shown, the transparent substrate is disposed at the bottommost level; the black matrix is dispose "on" the transparent substrate; expression "A on B" comprises the case of A directly contacting B or an component being interposed between A and B, but it does not specify any direction; and the term "horizontal bar" and "vertical bar" are employed to distinguish two portions that are perpendicular to each other, not for specifying any direction.

Lastly, the aforementioned embodiments are employed to describe, not to limit, the scope of the invention. Notwithstanding that a detailed description is given with references to the embodiments, as one of ordinary skill in the art should understand, the technique embodied in the aforementioned embodiments can be modified, or some technical features can be substituted with the equivalents; such modifications or substitutions do not deviate the nature from the spirit and scope of the invention embodied in the embodiments.

What is claimed is:

1. A liquid crystal display (LCD), comprising an array substrate, a color filter substrate, and a liquid crystal layer disposed between the array substrate and the color filter substrate, wherein the color filter substrate comprises:
    a transparent substrate; and
    a black matrix, which is disposed on the transparent substrate and comprises a plurality of horizontal bars and vertical bars; and
    first electrode lines, provided on the transparent substrate in correspondence with the respective horizontal bars or vertical bars of the black matrix, formed directly on the black matrix and disposed in the area where the black matrix is disposed:
    second electrode lines, provided on the transparent substrate each between the respective horizontal bars or vertical bars of the black matrix and passing through respective opening regions of the black matrix;
    wherein pixel electrodes are provided in pixel regions of the array substrate, the pixel regions of the array substrate correspond to the opening regions of the black matrix on the color filter substrate, each of the pixel electrodes is in a plate form and comprises separate slit units, each of the slit units comprises a plurality of slits, and each of the second electrode lines directly overlap with a part extended between two adjacent slit units of each of corresponding pixel electrodes.

2. The LCD according to claim 1,
    wherein each of the second electrode lines corresponds to the part between the two slit units of the respective pixel electrodes.

3. The LCD according to claim 1, wherein the material for the second electrode ones is transparent material.

4. The LCD according to claim 3, wherein the transparent material comprises ITO or IZO.

* * * * *